United States Patent
Fan et al.

(10) Patent No.: US 12,469,153 B2
(45) Date of Patent: Nov. 11, 2025

(54) TRACKING WITH MULTIPLE CAMERAS

(71) Applicant: HP (Chongqing) Co., Ltd, Chongqing (CN)

(72) Inventors: Yongkang Fan, Beijing (CN); Xi Lu, Beijing (CN); Hai Xu, Beijing (CN); Hailin Song, Beijing (CN); Wenxue He, Beijing (CN)

(73) Assignee: HP (Chongqing) Co., Ltd, Chongqing (CN)

( * ) Notice: Subject to any disclaimer, the term of this patent is extended or adjusted under 35 U.S.C. 154(b) by 340 days.

(21) Appl. No.: 18/041,140

(22) PCT Filed: Sep. 9, 2020

(86) PCT No.: PCT/CN2020/114132
§ 371 (c)(1),
(2) Date: Feb. 9, 2023

(87) PCT Pub. No.: WO2022/051920
PCT Pub. Date: Mar. 17, 2022

(65) Prior Publication Data
US 2023/0306618 A1    Sep. 28, 2023

(51) Int. Cl.
*G06T 7/70*       (2017.01)
*G06T 7/292*      (2017.01)
*G06V 10/74*      (2022.01)
*H04N 23/69*      (2023.01)
*H04N 23/695*     (2023.01)

(52) U.S. Cl.
CPC ............... *G06T 7/292* (2017.01); *G06T 7/70* (2017.01); *G06V 10/761* (2022.01); *H04N 23/69* (2023.01); *H04N 23/695* (2023.01); *G06V 2201/07* (2022.01)

(58) Field of Classification Search
CPC . G06T 7/292; G06T 7/70; G06T 2207/10016; G06T 2207/30201; G06V 10/761; G06V 2201/07; H04N 23/69; H04N 23/695; H04N 7/147; H04N 7/185
USPC ........................................................ 382/103
See application file for complete search history.

(56) References Cited

U.S. PATENT DOCUMENTS

| | | | |
|---|---|---|---|
| 2005/0134685 A1 | 6/2005 | Egnal et al. | |
| 2012/0154599 A1 | 6/2012 | Huang | |
| 2014/0049595 A1 | 2/2014 | Feng et al. | |
| 2016/0165337 A1* | 6/2016 | Trestain ............... | G10K 11/004 381/387 |

(Continued)

FOREIGN PATENT DOCUMENTS

| | | |
|---|---|---|
| CN | 103348673 A | 10/2013 |
| CN | 104349040 A | 2/2015 |
| CN | 108377368 A | 8/2018 |

(Continued)

*Primary Examiner* — Stephen P Coleman
(74) *Attorney, Agent, or Firm* — Quarles & Brady LLP (57) ABSTRACT

A method may include identifying primly camera speaker coordinates of a location of a speaker relative to a primary camera, converting the primary camera speaker coordinates to secondary camera speaker coordinates, the secondary camera speaker coordinates being of the location and relative to a secondary camera, and adjusting, using the secondary camera speaker coordinates of the secondary camera, a view setting of the secondary camera to track the location of the speaker.

20 Claims, 9 Drawing Sheets

(56) References Cited

U.S. PATENT DOCUMENTS

2019/0304137 A1  10/2019  Campbell et al.
2021/0400238 A1  12/2021  Li et al.

FOREIGN PATENT DOCUMENTS

CN    110324575 A    10/2019
CN    111291585 A    6/2020

* cited by examiner

TRACKING WITH MULTIPLE CAMERAS

CROSS-REFERENCE TO RELATED APPLICATIONS

This application is related to International Application Number PCT/CN2020/094294 filed on Jun. 4, 2020 under the Patent Cooperation Treaty (PCT), International Application Number PCT/CN2020/095293 filed on Jun. 10, 2020 filed under the PCT, and International Application Number PCT/CN2020/096480 filed on Jun. 17, 2020 filed under the PCT. PCT/CN2020/094294, PCT/CN2020/095293, and PCT/CN20201096480 are hereby incorporated by reference herein.

BACKGROUND

During a videoconference, people at a videoconferencing endpoint interact with people at one or more other videoconferencing endpoints. Some videoconferencing systems capture images of conference participants from different angles. For example, video conferencing systems may use multiple cameras to zoom in and focus on different speakers. A challenge is to track a speaker with multiple cameras.

SUMMARY

In general, in one aspect, one or more embodiments relate to a method may include identifying primary camera speaker coordinates of a location of a speaker relative to a primary camera, converting the primary camera speaker coordinates to secondary camera speaker coordinates, the secondary camera speaker coordinates being of the location and relative to a secondary camera, and adjusting, using the secondary camera speaker coordinates of the secondary camera, a view setting of the secondary camera to track the location of the speaker.

In general, in one aspect, one or more embodiments relate to a system that includes a primary camera, a processor, and a memory. The memory includes an application that executes on the processor and uses the memory. The application is configured for identifying primary camera speaker coordinates of a location of a speaker relative to the primary camera, converting the primary camera speaker coordinates to secondary camera speaker coordinates, the secondary camera speaker coordinates being of the location and relative to a secondary camera, and adjusting, using the secondary camera speaker coordinates of the secondary camera, a view setting of the secondary camera to track the location of the speaker.

In general, in one aspect, one or more embodiments relate to a set of one or more non-transitory computer readable mediums that include computer readable program code for identifying primary camera speaker coordinates of a location of a speaker relative to a primary camera, converting the primary camera speaker coordinates to secondary camera speaker coordinates, the secondary camera speaker coordinates being of the location and relative to a secondary camera, and adjusting, using the secondary camera speaker coordinates of the secondary camera, a view setting of the secondary camera to track the location of the speaker.

Other aspects of the disclosure will be apparent from the following description and the appended claims.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before" "after" "single", and other such terminology. Rather, the use of ordinal numbers is to distinguish between the elements. By way of an example, a first element is distinct from a second element, and the first element may encompass more than one element and succeed (or precede) the second element in an ordering of elements.

Video conferencing endpoints may use multiple views for different scenes. A view is a portion of the video that is to be displayed. Example views include a room view, a group view, a speaker view, and a conversation view. A room view may capture an entire room that is being imaged by a camera of an endpoint without zooming into a particular portion of the raw image from the image sensor of a camera. A speaker view zooms into the face of a speaker in the image, which may be identified by applying facial recognition algorithms to the image data from the camera. A group view zooms into a group of people in a room, which may be identified by applying facial recognition algorithms. A conversation view may combine separate views of two (or more) speaker views into a single view (e.g., the video frame of a conversation view may include one rectangle that is the video frame of a first speaker view and a second rectangle that is the video frame of a second speaker view).

When the system identifies a speaker, the system may adjust the pan, tilt, and zoom settings of a secondary camera to focus and zoom in on the face of the speaker. When the secondary camera zooms in on the face of the speaker, the secondary camera (which may be a mechanical pan, tilt, and zoom camera) may not be able to track the movements of the speaker. The system addresses this issue by updating the pan, tilt, and zoom settings of the secondary camera using coordinates for the speaker that are relative to a primary camera, as further detailed below.

The term "speaker" refers to any target individual in a room for focusing the camera. The speaker may or may not be actively speaking. For example, the speaker may be detected as actively speaking, about to speak, or a particular person of interest, such as a lecturer. Further, the speaker may change between different video frames of a video conference.

Figure 1A:
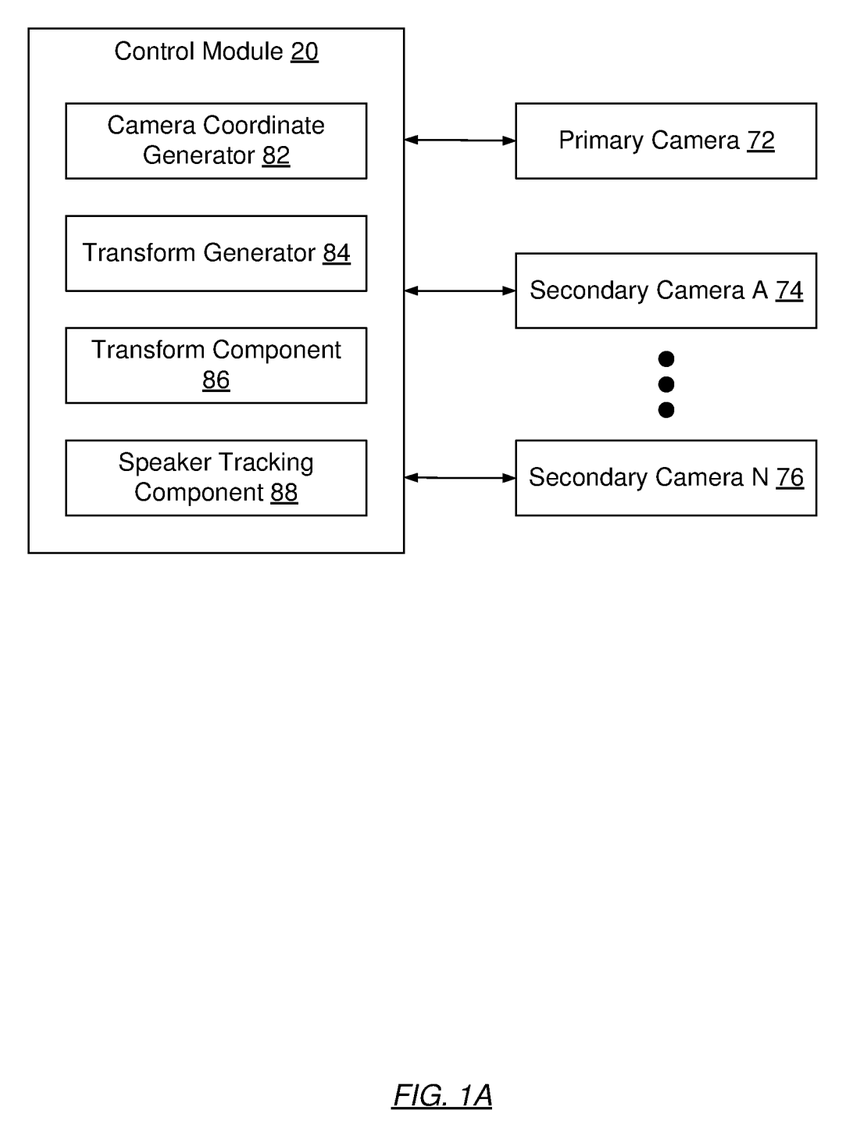
FIG. 1A, FIG. 1B, and FIG. 1C show diagrams of systems in accordance with disclosed embodiments.

FIG. 1A illustrates components of a system that tracks speakers with multiple cameras. The components include the control module (20) and the cameras (72) through (76).

The control module (20) includes hardware and software that controls the secondary cameras A (74) through N (76) based on a speaker being tracked with the primary camera (72). The control module (20) includes the camera coordinate generator (82), the transform generator (84), the transform component (86), and the speaker tracking component (88). The components (82) through (88) of the control module (20) may be implemented with one or more customized application specific integrated circuits, field programmable gate arrays, software programs, data, etc. The control module (20) may be part of the endpoint (10) (of FIG. 1B).

The camera coordinate generator (82) includes the hardware and software components that identify coordinates relative (i.e., relative coordinates) to the cameras of the system. The camera coordinate generator (82) may receive coordinates identifying the distances and angles to a speaker imaged with multiple cameras and generate the relative coordinates between the cameras. The distances and angles of the speaker are relative to a camera. The relative coordinates between two cameras may identify the locations of the two cameras in a coordinate system in which the two cameras are located on orthogonal axes of the coordinate system.

The transform generator (84) includes the hardware and software components that generate a transform between the different coordinates of the different cameras. For example, the transform generator (84) may receive the relative coordinates from the camera coordinate generator (82) that identifies the relative coordinates between the primary camera (72) and the secondary camera A (74). The transform generator (84) may use the relative coordinates to generate a function that converts coordinates (e.g., of a speaker) that are relative to the primary camera (72) to coordinates that are relative to the secondary camera (74). The transform generated by the transform generator (84) may be stored as the transform component (86).

The transform component (86) is generated by the transform generator (84) includes the hardware and software components that convert coordinates relative to one camera to coordinates that are relative to another camera. For example, the transform component (86) may receive speaker coordinates that identify the distance and angle to the speaker relative to the primary camera (72) and convert the coordinates to be relative to the secondary camera A (74).

The speaker tracking component (88) includes the hardware and software components that use coordinates from one camera to track a speaker with a different camera. For example, the speaker tracking component may use speaker coordinates from the primary camera (72) to track a speaker with at least one of the secondary cameras A (74) through N (76).

The cameras (72) through (76) include hardware, software, and sensors to generate, record, and transmit images (video frames) and streams of images (video streams). The primary camera (72) may track a speaker detected in the images generated by the cameras (72) through (76). The secondary cameras A (74) through N (76) may adjust view settings (which may include pan, tilt, and zoom values) to track and follow the speaker using coordinates of the speaker generated from the primary camera (72).

The cameras (72) through (76) may be part of the camera set (46) (of FIG. 1B), The cameras (72) through (76) may include electronic pan, tilt, and zoom (EPTZ) cameras and mechanical pan, tilt, and zoom (MPTZ) cameras. In one embodiment, the primary camera (72) is an EPTZ camera and the secondary cameras A (74) through N (76) are MPTZ cameras.

When the system includes multiple secondary cameras and detects a new speaker, a different camera may be used to focus in on the new speaker. For example, the secondary camera A (74) may focus on the previous speaker while the secondary camera N (76) pans, tilts, and zooms to focus onto the new speaker. After the secondary camera N (76) focuses on the new speaker, the system may cut from using the video stream from the secondary camera A (74) to the video stream from the secondary camera N (76).

Each camera of the cameras (72) through (76) is associated with a view for the particular camera. The view is defined with view settings that include a pan setting, a tilt setting, and a zoom setting that identify the pan, tilt, and zoom of a camera for the current view. For cameras with electronic pan, tilt, and zoom the view settings may be electronic view settings that define a rectangle within an image. For cameras with mechanical pan, tilt, and zoom, the camera may include motors to physically pan, tilt, and zoom the camera to the positions identified by the mechanical view settings. A camera may have both electronic view settings and mechanical view settings. The primary camera (72) has a primary view defined by primary view settings. The secondary cameras A (74) through N (76) each have a secondary view defined by secondary view settings. The view settings are described further below.

Figure 1B:
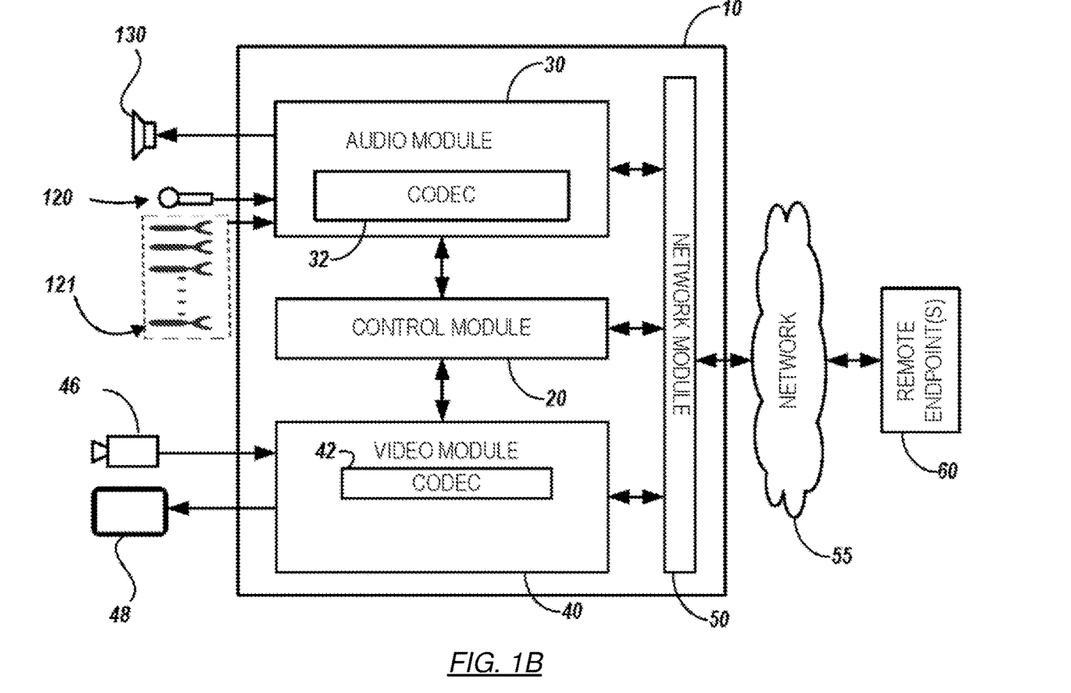

FIG. 1B illustrates a possible operational environment for example circuits of this disclosure. Specifically, FIG. 1B illustrates a conferencing apparatus or endpoint (10) in accordance with an embodiment of this disclosure. The conferencing apparatus or endpoint (10) of FIG. 1B communicates with one or more remote endpoints (60) over a network (55). The endpoint (10) includes an audio module (30) with an audio codec (32), and a video module (40) with a video codec (42). These modules (30, 40) operatively couple to the control module (20) and the network module (50). The modules (30, 40, 20, 50) include dedicated hardware, software executed by one or more processors, or a combination thereof. In some examples, the video module (40) corresponds to a graphics processing unit (GPU), software executable by the graphics processing unit, a central processing unit (CPU), software executable by the CPU, an image processor (also referred to as an image signal processor (ISP)) that processes raw image data from the camera set (46), an application processor that executes applications and other programs of the modules, etc. In some examples, the control module (20) includes a CPU or application processor, executable software, or a combination thereof. In some examples, the network module (50) includes one or more network interface devices, a CPU, software executable by the CPU, or a combination thereof. In some examples, the audio module (30) includes, a CPU, software executable by the CPU, a sound card, or a combination thereof. In some examples, the camera set (46) includes an image processor, image processing software, or a combination thereof. The different processors, programs, and applications running on the endpoint (10) may communicate with each other using application programming interfaces (APIs) exposed by the processors, programs, and applications.

The control module (20) of the endpoint (10) may detect and focus on an active talker or speaker captured by the images and streams from the camera set (46). The microphone (120) may determine the direction from the videoconferencing device to the active talker. One or more microphones may determine the location of a subject (e.g., an active talker or speaker), relative to locations of the microphones and the cameras of the camera set (46). The cameras of the camera set (46) are used to locate the face of an active talker. Based on the direction and the location, a view of the active talker can be captured for transmission to another endpoint and the active talker can be tracked during a videoconference.

The endpoint (10) may individually score multiple frames in a stream. The individual scores of the frames can be normalized using standard statistical methods. Outlier scores of individual frames can be rejected. The scores of the individual frames are averaged to acquire a comprehensive score for a video stream. Based on the comprehensive score, a determination may be made as to which way a person's head is pointing or which way a person is facing. When a person is an active talker that person's face may be present in the camera feed of more than one camera of the camera set (46).

In general, the endpoint (10) can be a conferencing device, a videoconferencing device, a personal computer with audio or video conferencing abilities, a smartphone, or any similar type of communication device. The endpoint (10) is configured to generate near-end audio and video and to receive far-end audio and video from the remote endpoints (60). The endpoint (10) is configured to transmit the near-end audio and video to the remote endpoints (60) and to initiate local presentation of the far-end audio and video.

The microphone (120) captures audio and provides the audio to the audio module (30) and codec (32) for processing. The microphone (1120) can be a table or ceiling microphone, a part of a microphone pod, an integral microphone to the endpoint, or the like. Additional microphones (121) can also be provided. Throughout this disclosure all descriptions relating to the microphone (120) apply to any additional microphones (121), unless otherwise indicated. The endpoint (10) may use the audio captured with the microphone (120) for the near-end audio.

The camera set (46) captures video and provides the captured video to the video module (40) and codec (42) for processing to generate the near-end video. For each video frame of near-end video captured by the camera set (46), the control module (20) or the video module (40) may crop the video frame to the view region based on a selected view. In general, a video frame (also referred to as a frame) is a single still image in a video feed or video stream, that together with the other video frames form the video stream sent between endpoints. The view region may be selected based on the near-end audio generated by the microphone (120) and the additional microphones (121), other sensor data, or a combination thereof. For example, the control module (20) may select an area of the video frame depicting a participant who is currently speaking as the view region. As another example, the control module (20) may select the entire video frame as the view region in response to determining that no one has spoken for a period of time. Thus, the control module (20) selects view regions based on the context of a communication session.

The endpoint (10) uses the codecs (32, 42) to encode the near-end audio and the corrected near-end video according to an encoding standard, such as MPEG-1, MPEG-2, MPEG-4, H.261, H.263, H.264, etc. Then, the network module (50) outputs the encoded near-end audio and corrected video to the remote endpoints (60) via the network (55) using an appropriate protocol. Similarly, the network module (50) receives the far-end audio and video via the network (55) from the remote endpoints (60) and sends these to their respective codecs (32, 42) for processing. Eventually, a loudspeaker (130) outputs the far-end audio (received from a remote endpoint), and a display (48) outputs the far-end video. The display (48) also outputs the corrected near-end video in some embodiments.

Thus, FIG. 1B illustrates an example of an improved device that uses coordinates from one camera to track speakers with other cameras. In particular, the device of FIG. 1B may operate according to one of the methods described further below with reference to the other figures of the application. As described below, these methods may improve video quality during a communication session.

Figure 1C:
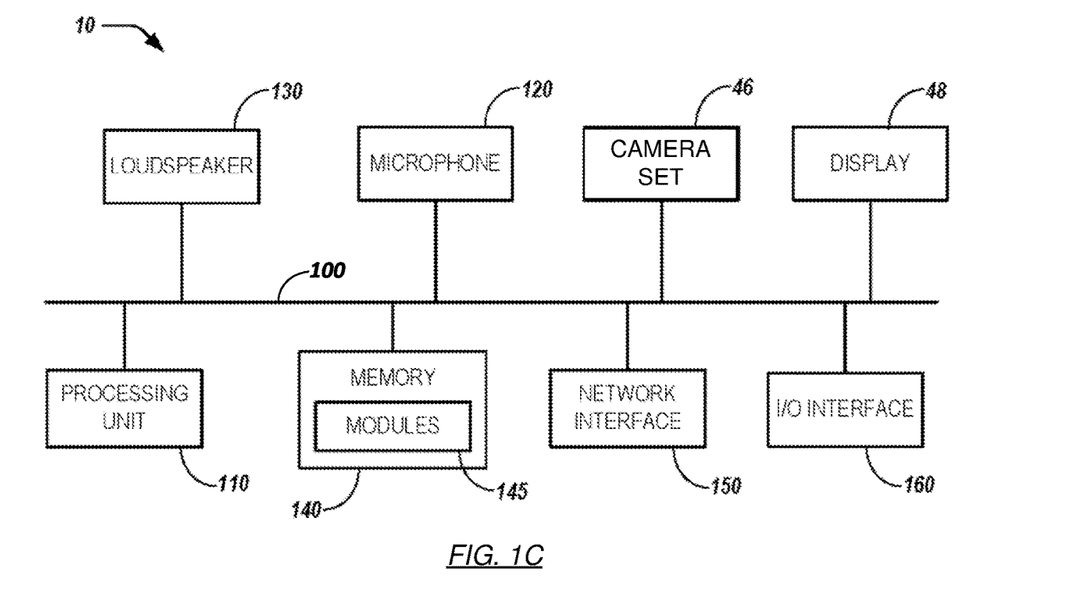

FIG. 1C illustrates components of the conferencing endpoint of FIG. 1B with additional detail. The endpoint (10) includes the processing unit (110), the memory (140), the network interface (150), and the general input/output (I/O) interface (160) coupled via the bus (100). As above, the endpoint (110) has the base microphone (120), the loudspeaker (130), the camera set (46), and the display (48).

The processing unit (110) may include multiple processors, including a CPU, a GPU, an application processor, etc. The memory (140) is a computer readable medium that may be any conventional memory such as SDRAM and can store modules (145) in the form of software and firmware with instructions, programs and data for controlling the endpoint (10). The stored modules (145) include the various video and audio codecs (32, 42) and software components of the other modules (20, 30, 40, 50) discussed previously. Moreover, the modules (145) can include operating systems, a graphical user interface (GUI) that enables users to control the endpoint (10), and other algorithms for processing audio/video signals.

The network interface (150) provides communications between the endpoint (10) and remote endpoints (60). By contrast, the general I/O interface (160) can provide data transmission with local devices such as a keyboard, mouse, printer, overhead projector, display, external loudspeakers, additional cameras, microphones, etc.

As described above, the endpoint (10) uses coordinates of a speaker relative to one camera to track and follow the speaker with another camera. Thus, FIG. 1C illustrates an example of a physical configuration of a device that enhances video quality by seamlessly tracking a speaker.

In one embodiment, the control module (20) (of FIG. 1B) is included in one or more of the cameras of the camera set (46) that perform the calculations to convert the coordinates from being relative to one camera to being relative to another camera. For example, the primary camera (72) (of FIG. 1A) may be part of the camera set (46), include the control module (20), and perform the calculations to convert coordinates from being relative to the primary camera (72) to being relative to at least one of the secondary cameras A (74) through N (76).

Figure 2:
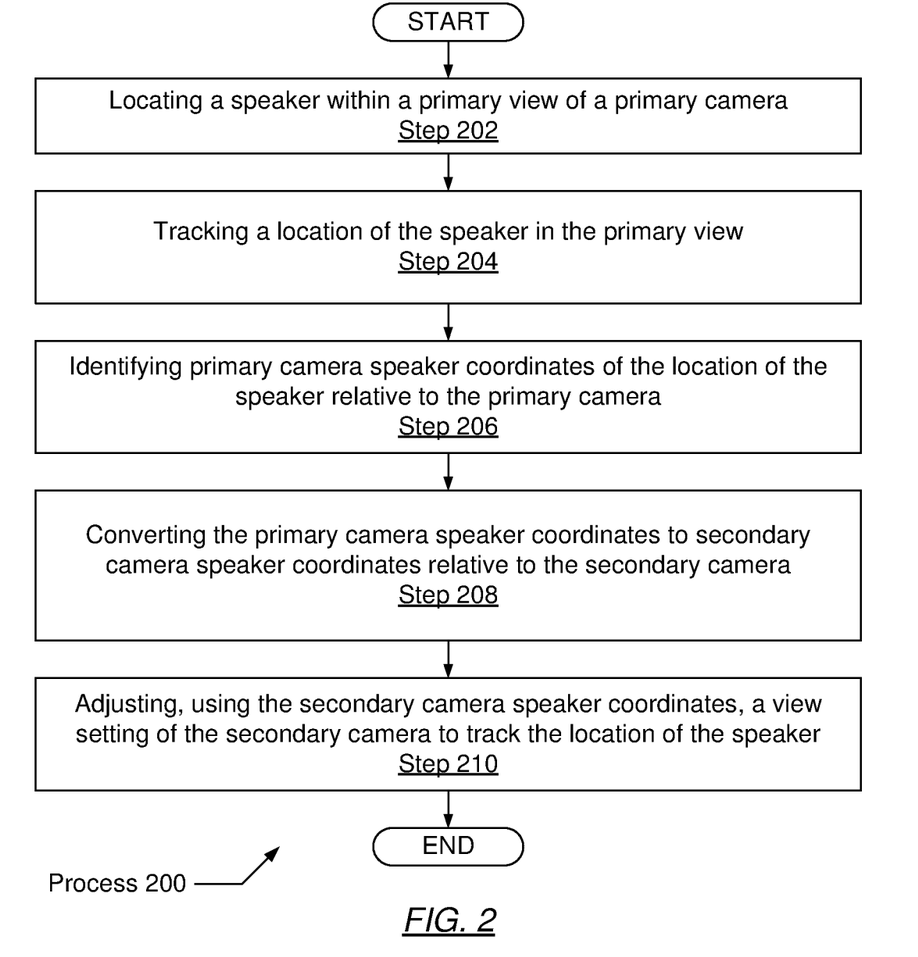
FIG. 2 shows a flowchart in accordance with disclosed embodiments.

FIG. 2 shows a flowchart of a method in accordance with one or more embodiments of the disclosure. The process (200) tracks a speaker with a secondary camera using coordinates from a primary camera. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven in accordance with one or more embodiments. By way of an example, determination steps may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

Turning to FIG. 2, in Step 202, the speaker within the primary view of the primary camera is located. The speaker is located in a video frame (captured via a camera) of a video feed that may be transmitted by the camera to a processor. The speaker may be located using a machine learning model that detects a face within a sub-image of a video frame. A speaker may be identified from a sequence of sub-images of a face of a person that show the mouth or lips of the person are moving, which may be recognized with another machine learning model. The speaker may also be identified when a machine learning model identifies the person is raising a hand to speak. The speaker may also be identified by sound source location.

In Step 204, a location of the speaker in the primary view is tracked. The speaker may move relative to the position of the primary camera and relative to the primary view. As the speaker moves, the system may continuously locate the speaker and generate speaker coordinates that identify the distance and angle between the primary camera and the speaker. The distance is recorded as a distance value and the angle is recorded as an angle value. The distance value identifies a distance between the primary camera and the location of the speaker and the angle value identifies an angular offset value between the location of the speaker and an optical axis of the primary camera.

In one embodiment, the distance values are determined using a face height. The face height may identify the distance with a length in pixels between the chin and forehead of a person in an image. The face height may be more accurate than using a face size. The face size maybe a cross sectional area that may not remain accurate between the side of a person's face and the front of a person's face.

In Step 206, primary camera speaker coordinates of the location of the speaker relative to the primary camera are identified. Speaker coordinates identify the distance between a camera and the location of the speaker and the angle between the location of the speaker and an optical axis normal to the camera. The distance may be calculated using the size and position of the face of the speaker within a video frame.

In one embodiment, primary camera relative coordinates and secondary camera relative coordinates are determined before the speaker coordinates are identified. The primary camera relative coordinates identify the location of the primary camera relative to a point in space between the primary camera and the secondary camera. The secondary camera relative coordinates identify the location of the secondary camera relative to the same point in space. In one embodiment, the primary camera is located on a y axis that is orthogonal to an x axis on which the secondary camera is located.

In one embodiment, the primary camera relative coordinates and the secondary camera relative coordinates are determined a number of times at different positions to generate a set of primary camera relative coordinates and a set of secondary camera relative coordinates. As an example, the primary (or secondary) camera relative coordinates may be determined five times. The set of primary camera relative coordinates and the set of secondary camera relative coordinates may then be averaged over the number of times to generate average primary camera relative coordinates and average secondary camera relative coordinates that are used to identify the locations of the primary camera and the secondary camera relative to a point in space that may be between the two cameras.

In Step 208, the primary camera speaker coordinates are converted to secondary camera speaker coordinates of the location of the speaker relative to the secondary camera. The system determines a transform between the primary camera and the secondary camera. The transform converts the primary camera speaker coordinates to the secondary camera speaker coordinates. The transform may be a function that takes the primary camera speaker coordinates as inputs and then applies mathematical operations to the primary camera speaker coordinates to generate the secondary camera speaker coordinates as an output. In one embodiment, the average primary camera relative coordinates and the average secondary camera relative coordinates are used to generate the transform and then to convert the primary camera speaker coordinates to the secondary camera speaker coordinates.

In one embodiment, when the primary camera and the secondary camera are not perpendicular to each other and are not on a same horizontal plane, the primary camera speaker coordinates and the secondary camera speaker coordinates are converted to be perpendicular and in the same horizontal plane prior to generating the transform that converts from the primary camera coordinates to the secondary camera coordinates. When the primary cameras and secondary cameras are not on the same horizontal plane, the pitch of the head of a person imaged in the video frames from the camera may be used to project the cameras and the coordinates onto the same plane, which is discussed further below with FIG. 3E.

In Step 210, a view setting of the secondary camera is adjusted using the secondary camera speaker coordinates to track the location of the speaker. The secondary camera speaker coordinates (distance and angle) are converted to secondary view settings (pan, tilt, and zoom values). When the secondary, camera is a mechanical pan, tilt, and zoom camera, the motors of the camera may be driven to set the camera to the pan, tilt, and zoom values generated from the secondary camera speaker coordinates and focus on the speaker. The adjusting of the view settings may include sending the adjustments to the secondary camera and may include performing the adjustments by the secondary camera by changing the physical pan, tilt, and zoom of the secondary camera.

Figure 3A:
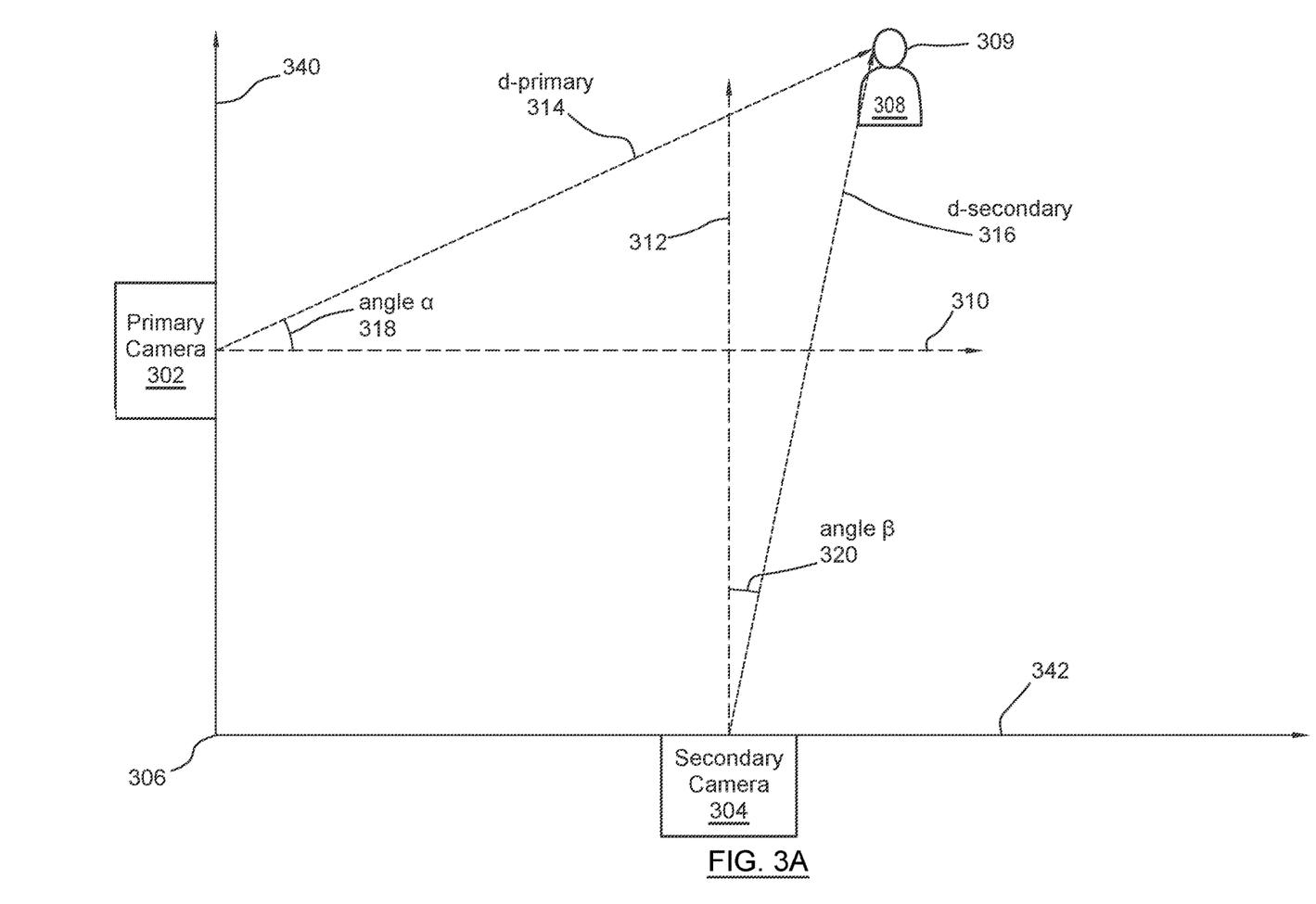
FIG. 3A, FIG. 3B, FIG. 3C, FIG. 3D, and FIG. 3E show examples in accordance with disclosed embodiments.
Figure 3B:
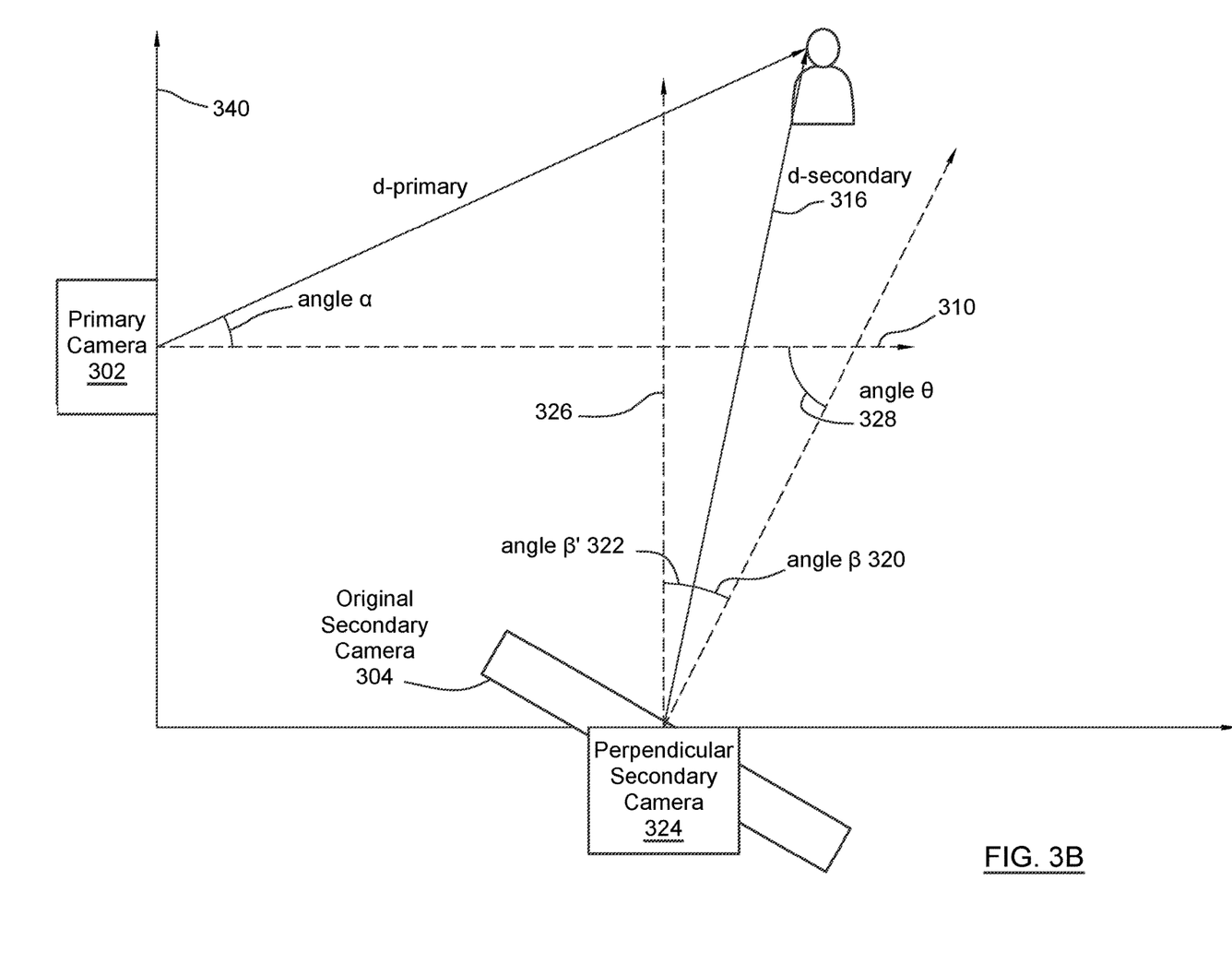
Figure 3C:
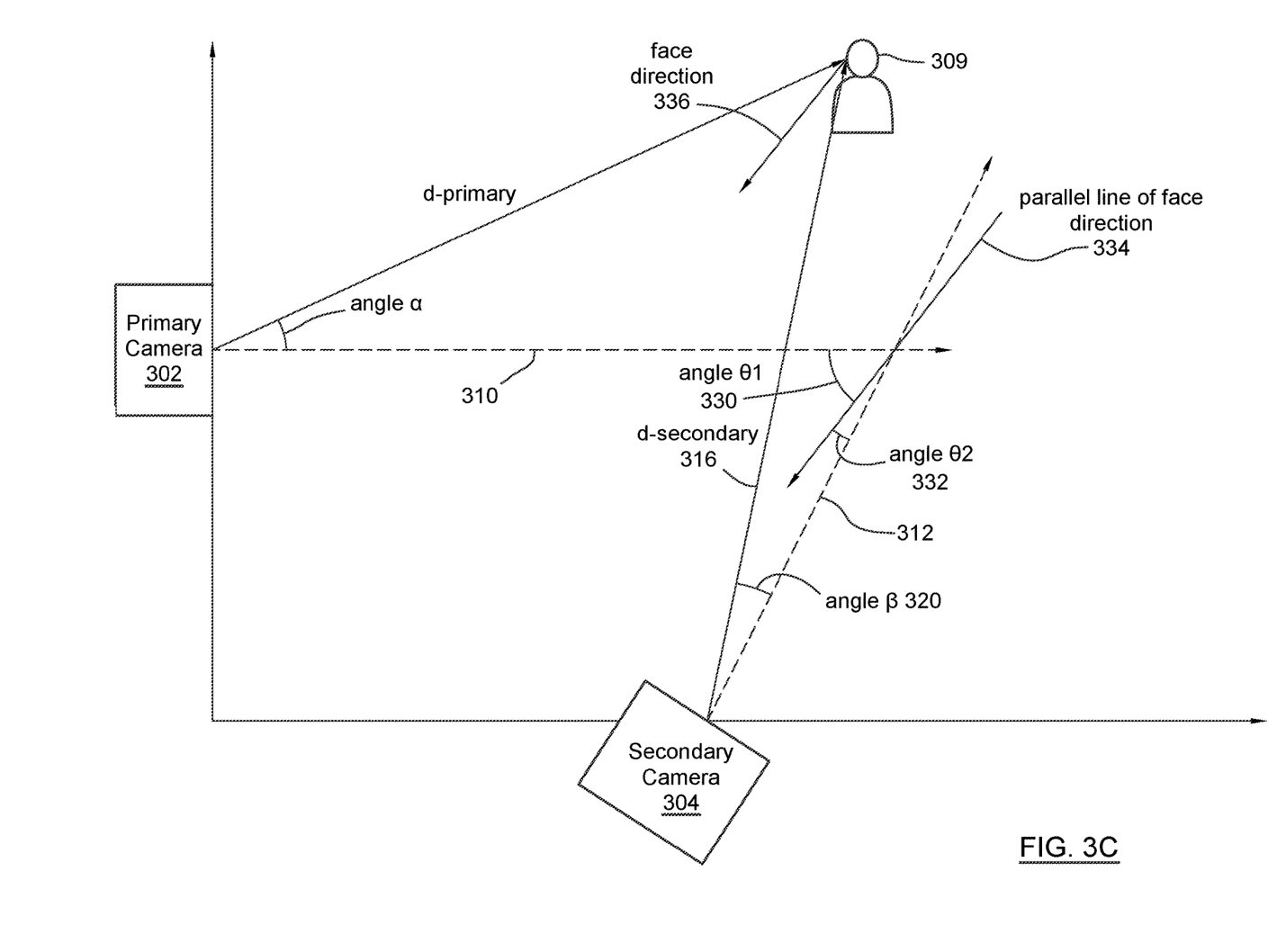
Figure 3D:
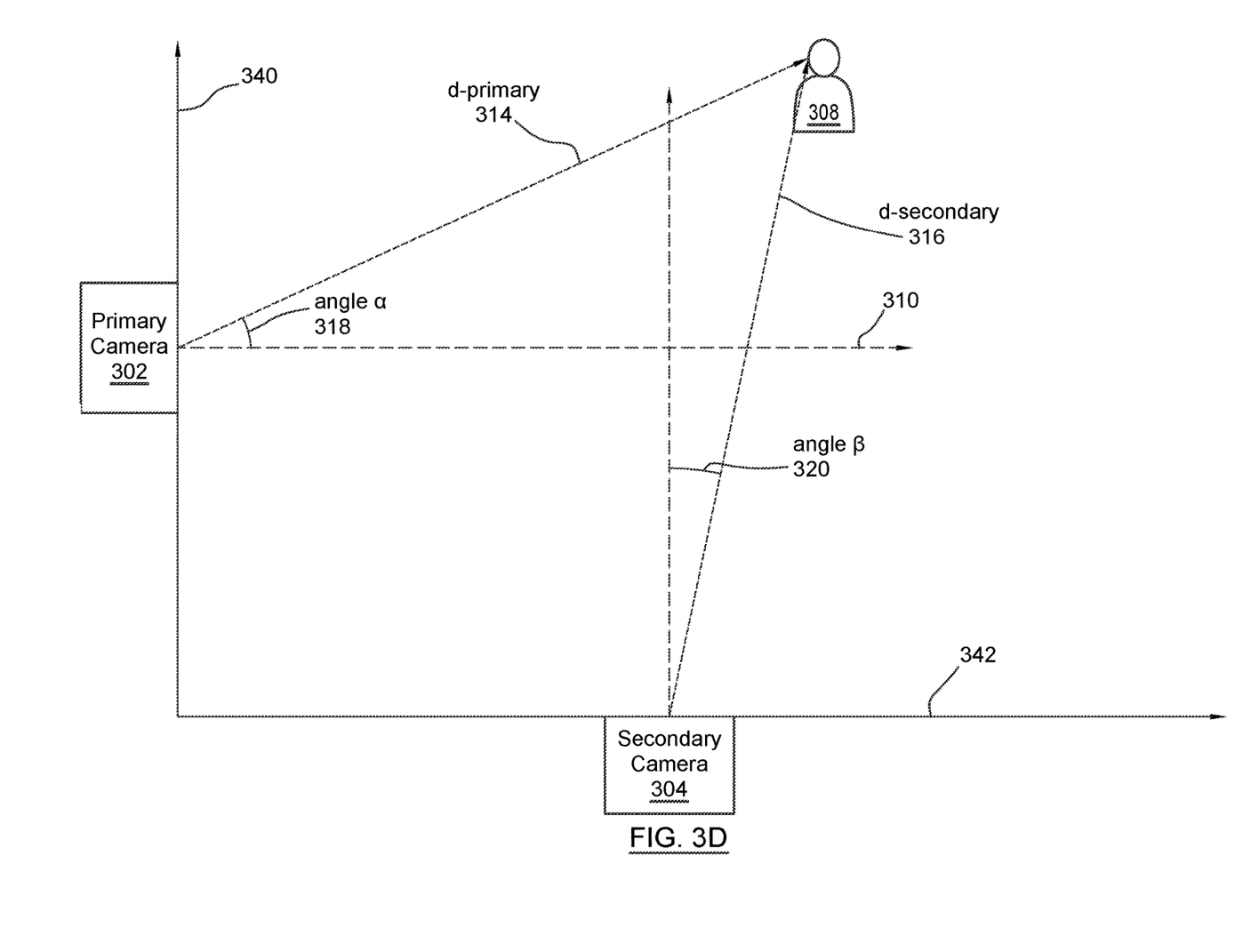
Figure 3E:
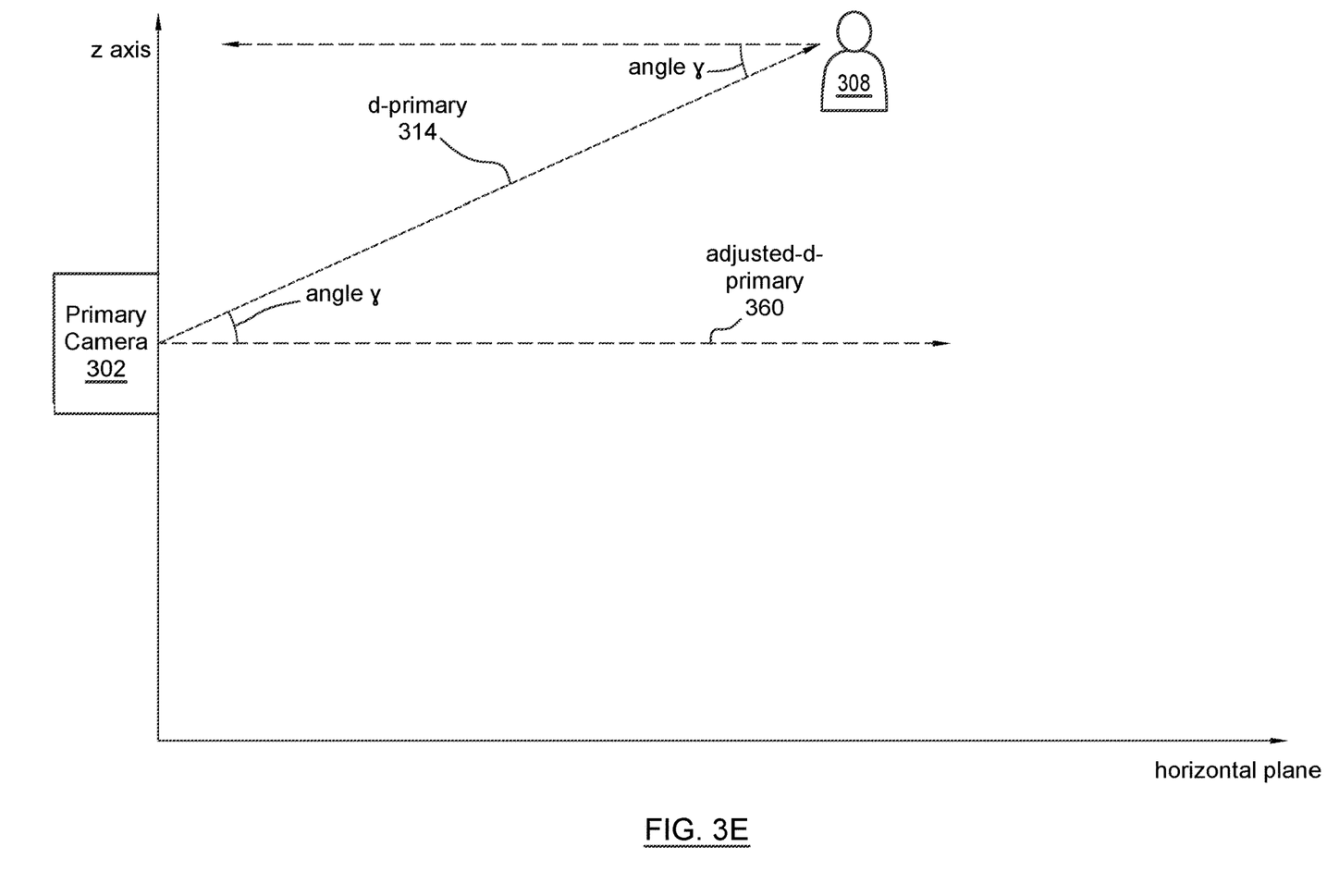
Figure 4A:
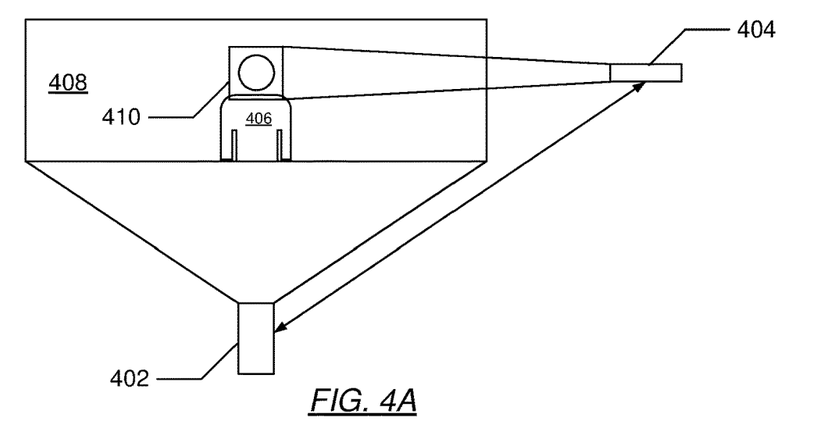
FIG. 4A, FIG. 4B, and FIG. 4C show an example of tracking in accordance with disclosed embodiments.
Figure 4B:
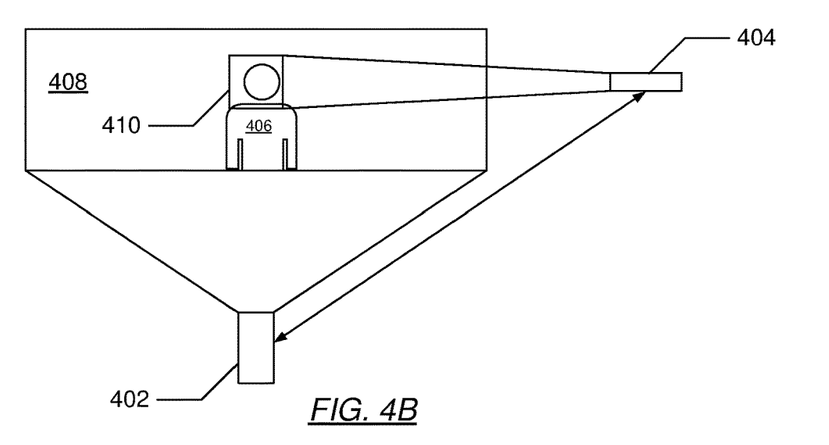
Figure 4C:
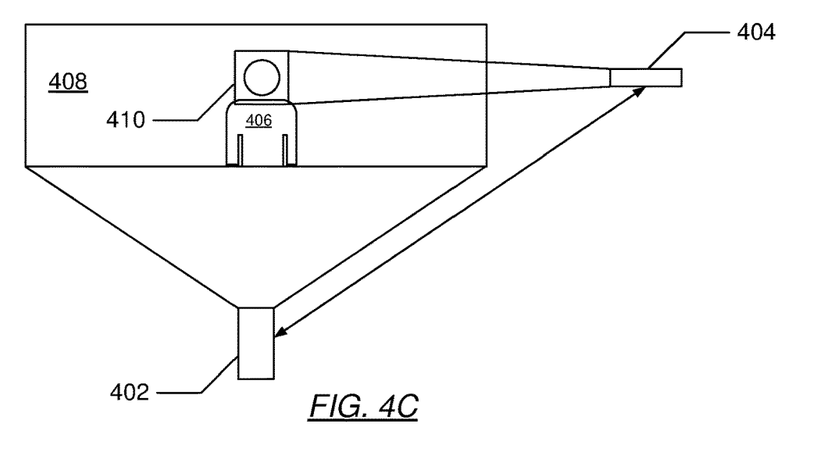

FIG. 3A through FIG. 3E and FIG. 4A through FIG. 4C show examples of systems in accordance with the disclosure. FIG. 3A shows an example of determining camera coordinates with perpendicular cameras. FIG. 3B shows an example of determining camera coordinates with cameras that are not perpendicular. an indirect cut. FIG. 3C shows an example of using face direction to determine coordinates. FIG. 4A through 4C show an example of tracking with a secondary camera using coordinates from a primary camera. The embodiments of FIG. 3A through FIG. 3E and FIG. 4A through FIG. 4C may be combined and may include or be included within the features and embodiments described in the other figures of the application. The features and elements of FIG. 3A through FIG. 3E and FIG. 4A through FIG. 4C are, individually and as a combination, improvements to the technology of video conferencing systems and imaging systems. The various features, elements, widgets, components, and interfaces shown in FIG. 3A through FIG. 3E and FIG. 4A through FIG. 4C may be omitted, repeated, combined, and/or altered as shown. Accordingly, the scope of the present disclosure should not be considered limited to the specific arrangements shown in FIG. 3A through FIG. 3E and FIG. 4A through FIG. 4C.

Turning to FIG. 3A, the primary camera (302) and the secondary camera (304) are perpendicular to each other on orthogonal axes (340) and (342) that intersect at point (306). Both the primary camera (302) and the secondary camera (304) include the person (308) (with the face 309) in their respective views. The optical axis (310) is normal to the primary camera (302) and identifies the direction of the primary camera (302). The optical axis (312) is normal to and identifies the direction of the secondary camera (304). The line (314) is the shortest distance from the primary camera (302) to the face (309) of the person (308). The line (316) is the shortest distance from the secondary camera (304) to the face (309). The angle α (318) is the angle between the optical axis (3110) and the line (314). The angle β (320) is the angle between the optical axis (312) and the line (316). The distance of the line (314) (referred to as d-primary) and the angle α (318) form the coordinates (also referred to as speaker coordinates) of the person (308) relative to the primary camera (302). The distance of the line (316) (referred to as d-secondary) and the angle β (320) form the coordinates of the face (309) relative to the secondary camera (304).

For the primary camera the equations Eq. 1 and Eq. 2 below apply, where "coord-face" are the x and y coordinates of the face (309); "coord-primary" are the x and y coordinates of the primary camera (302).

coord-face=coord-primary+(d-primary*cos(α),d-primary*sin(α))  (Eq. 1)

coord-face=(0,coord-y)+(d-primary*cos(α),d-primary*sin(α))  (Eq. 2)

For the secondary camera the following equations Eq. 3 and Eq. 4 below apply, where "coord-secondary" are the x and y coordinates of the secondary camera (304).

coord-face=coord-secondary+−d-secondary*sin(β),d-secondary*cos(β))  (Eq. 3)

coord-face=(coord-x,0)+(d-secondary*sin(β),d-secondary*cos(β))  (Eq. 4)

In accordance with the equations above, "coord-x" may be solve as follows using equations Eq. 5 and Eq. 6:

0+d-primary*cos(α)=coord-x−d-secondary*sin(α)  (Eq. 5)

coord-x=d-primary*cos(α)+d-secondary*sin(β)  (Eq. 6)

In accordance with the equations above, "coord-y" may be solved as follows using equations Eq. 7 and. Eq. 8:

coord-y+d-primary*sin(α)=0+d-secondary*cos(β)  (Eq. 7)

coord-y==d-secondary*cos(β)−d-primary*sin(α)  (Eq. 8)

As seen from the equations above, the coordinates of the primary camera (302) and the secondary camera (304) are a function of the distances between the cameras and the person and the angles between the optical axes of the cameras and the face of the person. I.e. with equation Eq. 9:

coord-primary,coord-secondary=f(d-primary,α,d-secondary,β)  (Eq. 9)

Turning to FIG. 3B, adjustments are made for when the primary camera (302) is not perpendicular to the secondary camera (304). The angle β (320) is rotated to form the angle β' (322) between the perpendicular axis (326) (which is perpendicular to the optical axis (310)) and the line (316).

The values for the angle β' (322) and the angle β (320) are as follows with equations Eq. 10, Eq. 11, and Eq. 12:

(β−β')+θ=90°  (Eq. 10)

β'=β−90°  (Eq. 11)

β=β'−θ+90°  (Eq. 12)

After solving for the angle β' (322), the method discussed with FIG. 3A (using perpendicular cameras) may be used to determine the coordinates of the primary camera (302) and the secondary camera (304). The angle θ (328) may be determined as described in FIG. 3C.

Turning to FIG. 3C, the angle θ (328) (of FIG. 3B) is made up of the angle θ1 (330) and the angle θ2 (332). The angle θ1 (330) is the angle between the optical axis (310) and the parallel line (334), which is determined with the primary camera (302). The parallel line (334) is parallel to the face direction (336) of the face (309). The face direction (336) may be determined using a machine learning model. The angle θ2 (332) is the angle between the optical axis (312) and the parallel line (334), which is determined with the secondary camera (304).

Turning to FIG. 3D, conversion between coordinates relative to the primary camera (302) and the secondary camera (304) are performed using the methods described in FIG. 3A through FIG. 3C. For the primary camera (302), the person is detected at the distance d-primary of the line (314) with the angle α (318). The coordinates of the person (308) relative to the primary camera (302) are as follows.

(d-primary*cos(α),d-primary*sin α))

Coordinating the primary camera (302) with the secondary camera (304) has the primary camera (302) on the y-axis (340) with the secondary camera (304) on the x axis (342). The primary camera (302) is at (0, coord-y), as discussed in FIG. 3A, and the secondary camera (304) is at the coordinates (coord-x, 0), as discussed in FIG. 3A. The person (308) is detected at the coordinate value below.

(d-primary*cos(α),d-primary*sin(α)+coord-y)

The values above are converted with a transform to be relative to the secondary camera (304). The person (308), relative to the secondary camera (304), is at the coordinates below.

(d-primary*cos(α)−coord-x,d-primary*sin(α)+coord-y)

The angle β (320) may be calculated as indicated in equation Eq. 13 below.

$$\beta = \arctan\left(\frac{d-\text{primary} * \cos(\alpha) - \text{coord} - x}{d-\text{primary} * \sin(\alpha) + \text{coord} - y}\right)$$  (Eq. 13)

As indicated above, the distance of the line (316) and the angle β (320) are a function of the distance of the line (314), the angle α (318), the coordinates of the primary camera (302) (0, coord-y), and the and the coordinates of the secondary camera (304) (coord-x, 0). I.e. with equation Eq. 14:

(d-secondary,β)=f(d-primary,α,coord-x,coord-y)  (Eq. 14)

Turning to FIG. 3E, when the primary camera (302) and the person (308) are at different heights, the distance between the primary camera (302) and the person (308) may be adjusted and the adjusted distance may be used in the calculations. The adjusted distance may be calculated with the equation Eq. 15 below.

$$\text{adjusted-}d\text{-primary} = d\text{-master} * \cos(\gamma) \quad \text{(Eq. 15)}$$

The length of the line (314) is "d-primary" is the actual distance between the primary camera (302) and the person (308). The length of the line (360) is "adjusted-d-primary", which is the distance projected onto a horizontal plane. The head pose pitch angle is $\gamma$, which may be identified using a machine learning algorithm.

Turning to FIG. 4A, the primary camera (402) is connected with the secondary camera (404). The primary camera (402) is an electronic pan, tilt, and zoom (EPTZ) camera and the secondary camera (404) is a mechanical pan, tilt, and zoom (MPTZ) camera. The relative coordinates between the primary camera (402) and the secondary camera (404) are determined using the face position of the person (406). The person (406) is in the view (408) of the primary camera (402) and the view (410) of the secondary camera (404). After determining the relative positioning of the cameras, a transform is created that converts coordinates relative to the primary camera (402) to coordinates that are relative to the secondary-camera (404).

Turning to FIG. 4B, the person (406) has moved within the primary view (408) so that the secondary view (410) is no longer centered on the face of the person (406). The system determines the new coordinates of the person (406) relative to the primary camera (402). The system then uses the transform to convert the coordinates to be relative to the secondary camera (404).

Turning to FIG. 4C, the mechanical pan, tilt, and zoom settings for the secondary camera (404) are adjusted using the converted coordinates. Adjusting the settings centers the person (406) within the secondary view (410). As the person (406) continues to move, the secondary camera (404) continues to track and follow the person (406).

The above description of functions presents only a few examples of functions performed by the disclosed systems. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method comprising:
   identifying primary camera speaker coordinates of a location of a speaker relative to a primary camera;
   converting the primary camera speaker coordinates to secondary camera speaker coordinates, the secondary camera speaker coordinates being of the location and relative to a secondary camera; and
   adjusting, using the secondary camera speaker coordinates of the secondary camera, a view setting of the secondary camera to track the location of the speaker.

2. The method of claim 1, further comprising:
   determining a transform between the primary camera and the secondary camera; and
   converting the primary camera speaker coordinates to the secondary camera speaker coordinates using the transform.

3. The method of claim 1, further comprising:
   determining, for a number of times, primary camera relative coordinates and secondary camera relative coordinates to generate a set of primary camera relative coordinates and a set of secondary camera relative coordinates; and
   averaging, over the number of times, the set of primary camera relative coordinates and the set of secondary camera relative coordinates to generate average primary camera relative coordinates and average secondary camera relative coordinates; and
   converting, using the average primary camera relative coordinates and the average secondary camera relative coordinates, the primary camera speaker coordinates to the secondary camera speaker coordinates.

4. The method of claim 1, further comprising:
   converting the primary camera speaker coordinates and the secondary camera speaker coordinates to be perpendicular and in the same horizontal plane.

5. The method of claim 1, further comprising:
   identifying the primary camera speaker coordinates,
   wherein the primary camera speaker coordinates comprise a primary camera distance value and a primary camera angle value,
   wherein the primary camera distance value identifies a distance between the primary camera and the location, and
   wherein the primary camera angle value identifies an angular offset value between the location and an optical axis of the primary camera.

6. The method of claim 1, wherein the view setting comprises at least one of a pan setting, a tilt setting, and a zoom setting.

7. The method of claim 1, further comprising:
   determining a primary camera distance value of the primary camera speaker coordinates using a face height.

8. The method of claim 1, further comprising:
   locating the speaker within a primary view of the primary camera.

9. A system comprising:
   a primary camera;
   a processor;
   a memory; and
   the memory comprising an application, wherein the application executes on the processor, uses the memory, and is configured for:
      identifying primary camera speaker coordinates of a location of a speaker relative to the primary camera;
      converting the primary camera speaker coordinates to secondary camera speaker coordinates, the secondary camera speaker coordinates being of the location and relative to a secondary camera; and
      adjusting, using the secondary camera speaker coordinates of the secondary camera, a view setting of the secondary camera to track the location of the speaker.

10. The system of claim 9, wherein the application is further configured for:
    determining a transform between the primary camera and the secondary camera; and
    converting the primary camera speaker coordinates to the secondary camera speaker coordinates using the transform.

11. The system of claim 9, wherein the application is further configured for:
    determining, for a number of times, primary camera relative coordinates and secondary camera relative coordinates to generate a set of primary camera relative coordinates and a set of secondary camera relative coordinates; and averaging, over the number of times, the set of primary camera relative coordinates and the set of secondary camera relative coordinates to generate average primary camera relative coordinates and average secondary camera relative coordinates; and converting, using the average primary camera relative coordinates and the average secondary camera relative coordinates, the primary camera speaker coordinates to the secondary camera speaker coordinates.

12. The system of claim 9, wherein the application is further configured for:

converting the primary camera speaker coordinates and the secondary camera speaker coordinates to be perpendicular and in the same horizontal plane.

13. The system of claim 9, wherein the application is further configured for:

identifying the primary camera speaker coordinates, wherein the primary camera speaker coordinates comprise a primary camera distance value and a primary camera angle value, wherein the primary camera distance value identifies a distance between the primary camera and the location, and wherein the primary camera angle value identifies an angular offset value between the location and an optical axis of the primary camera.

14. The system of claim 9, wherein the view setting comprises at least one of a pan setting, a tilt setting, and a zoom setting.

15. The system of claim 9, wherein the application is further configured for:

determining a primary camera distance value of the primary camera speaker coordinates using a face height.

16. The system of claim 9, wherein the application is further configured for:

locating the speaker within a primary view of the primary camera.

17. A set of one or more non-transitory computer readable mediums comprising computer readable program code for:

identifying primary camera speaker coordinates of a location of a speaker relative to a primary camera;

converting the primary camera speaker coordinates to secondary camera speaker coordinates, the secondary camera speaker coordinates being of the location and relative to a secondary camera; and adjusting, using the secondary camera speaker coordinates of the secondary camera, a view setting of the secondary camera to track the location of the speaker.

18. The set of one or more non-transitory computer readable mediums of claim 17, further comprising computer readable program code for:

determining a transform between the primary camera and the secondary camera; and converting the primary camera speaker coordinates to the secondary camera speaker coordinates using the transform.

19. The set of one or more non-transitory computer readable mediums of claim 17, further comprising computer readable program code for:

determining, for a number of times, primary camera relative coordinates and secondary camera relative coordinates to generate a set of primary camera relative coordinates and a set of secondary camera relative coordinates; and averaging, over the number of times, the set of primary camera relative coordinates and the set of secondary camera relative coordinates to generate average primary camera relative coordinates and average secondary camera relative coordinates; and converting, using the average primary camera relative coordinates and the average secondary camera relative coordinates, the primary camera speaker coordinates to the secondary camera speaker coordinates.

20. The set of one or more non-transitory computer readable mediums of claim 17, further comprising computer readable program code for:

converting the primary camera speaker coordinates and the secondary camera speaker coordinates to be perpendicular and in the same horizontal plane.

* * * * *